United States Patent Office 3,017,745
Patented Jan. 23, 1962

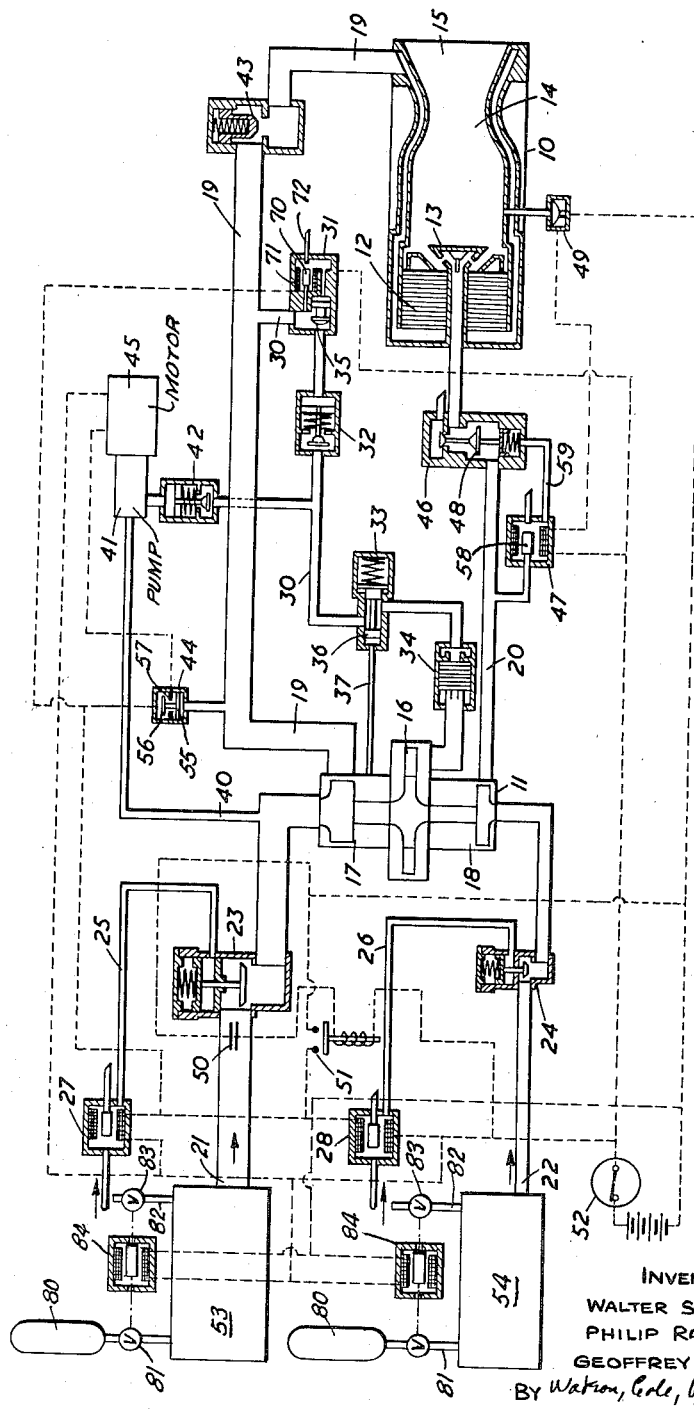

3,017,745
FUEL SUPPLY SYSTEMS FOR ROCKET ENGINES
Walter Shirley, Bedfordshire, Philip Ramsden, Wibsey, Bradford, and Geoffrey Herbert Nixon, Kenton, Harrow, England, assignors to D. Napier & Son Limited, London, England, a company of Great Britain
Filed Aug. 14, 1957, Ser. No. 678,250
Claims priority, application Great Britain Aug. 31, 1956
1 Claim. (Cl. 60—35.6)

This invention relates to rocket engines of the kind comprising a main combustion unit including a combustion chamber and a catalytic de-composition chamber, a turbo pump arranged to pump hydrogen peroxide to the decomposition chamber whence the de-composition products issue into the combustion chamber in the form of superheated steam and oxygen, and means for supplying an organic fuel to the combustion chamber where it is burnt together with the oxygen and super-heated steam.

The invention is particularly applicable to rocket engines of the kind referred to in which the turbo pump is itself driven by oxygen and super-heated steam and it is an object of the invention to provide an improved fuel supply system in an engine of this kind and in particular to provide improved starting arrangements therefor.

According to the invention a fuel supply system for a rocket engine of the kind referred to including a turbo pump arranged to deliver hydrogen peroxide under pressure to the main combustion unit through a main supply line, comprises a branch passage from the downstream side of the pump through which part of the hydrogen peroxide from the pump is fed to a catalytic decomposition chamber, and a conduit through which the oxygen and super-heated steam is led to the turbine part of the turbo-pump to drive the pump, and a starting circuit comprising a starter pump driven by an electric motor which receives hydrogen peroxide preferably from the upstream side of the pump and delivers it under pressure to a catalytic decomposition chamber (which may be the one referred to above), from whence the oxygen and super-heated steam is fed to the turbine, and means for automatically closing the starting circuit when the turbo-pump is operating and the outlet pressure from the pump is sufficiently high to provide the required flow of hydrogen peroxide to the decomposition chamber or chambers.

Preferably the means for closing the starter circuit comprises a pressure-responsive switch connected to the main hydrogen peroxide supply line on the downstream side of the pump.

Where the turbo pump includes a second pump for the organic fuel, the system preferably includes a control valve in the delivery side of this second pump which is operated automatically by a pressure sensitive device associated with the main combustion chamber of the rocket motor and arranged to open this valve to admit the hydrocarbon fuel only when the pressure or temperature in the combustion chamber has risen to a predetermined value corresponding to a substantial rate of delivery of the oxygen and super-heated steam into the chamber.

According to another feature of the invention, the auxiliary starting circuit includes the same decomposition chamber as is connected to the branch passage leading to the turbine from the main hydrogen peroxide supply passage between the pump and the main combustion unit, and non-return valves in this branch passage and in the auxiliary starting circuit which prevents hydrogen peroxide from the auxiliary starting circuit being returned through the branch passage, or vice versa.

The system in any case preferably includes a switch arranged to actuate the pressure generator in the starting circuit and simultaneously to allow a valve in the branch passage to open.

It may also include a switch arranged to open a main inlet valve on the upstream side of the pump, and arranged simultaneously to actuate the motor of a starter pump so that the starter pump applies a relatively low boosting pressure to the hydrogen peroxide supply to the pump causing it to flood the pump and the supply line to the main combustion unit up to a pressure operated on/off valve in this main supply line adjacent to the main combustion unit. The organic fuel may be supplied under pressure by a similar pump driven by the same turbine, and in this case the switch referred to above will preferably operate duplicate flow valves and boosting pressure controls in the organic fuel supply system.

Moreover the system will preferably include means for controlling the speed of the turbo pump comprising a valve controlling the supply of hydrogen peroxide to the catalystic de-composition chamber associated with the turbine, this valve being responsive to changes in the pressure of the hydrogen peroxide delivered by the pump.

The invention may be performed in various different ways but one specific embodiment will now be described by way of example with reference to the accompanying drawing which is a diagrammatic illustration of the fuel supply system of a rocket engine according to the invention.

In the first example illustrated in the figure the rocket engine comprises a main combustion unit 70, a turbo pump unit 11 and a fuel control system. The combustion unit comprises a catalytic de-composition chamber 12 of known kind, a burner assembly 13 through which the organic fuel which, in this case, is a gas turbine fuel such as kerosene or wide-cut gasoline is introduced into the combustion space and intermingled with the decomposition products. The combustion unit also includes a combustion chamber 14 and propulsion nozzle 15. These are all of known kind and since they form no part of the present invention they will not be described in detail.

The turbo pump unit 11 consists of a single stage axial flow turbine indicated generally at 16 arranged between two bearings incorporating seals with two centrifugal pumps 17, 18 mounted on opposite ends of the turbine shaft, The pumps are arranged to deliver hydrogen peroxide and kerosene respectively under pressure to supply lines 19, 20, leading to the combustion unit 10. Each pump comprises an open sided centrifugal impeller which is simple to manufacture and gives good efficiency at high speeds, the dynamic head being recovered by conical diffusers.

The fuel supply system comprises two main storage tanks 53, 54 for the liquid hydrogen peroxide and kerosene, inlet connections 21, 22 between the tanks and the two pumps, and the main supply lines 19, 20 from the output side of the pumps to the combustion unit. Each of the supply tanks 53, 54 has a nitrogen pressure bottle 80 connected to one end thereof through a valve 81. Adjacent the other end is a vent 82 including a valve 83. Each pair of valves 81, 83 is connected by a suitable mechanical connection, indicated in dot-dash lines, to the armature of a solenoid 84 whereby movement of the armature upon energization of the solenoid opens valve 81 between each nitrogen bottle and the corresponding tank and closes the valve 83 of vent 82. The electrical leads from each solenoid 84 are connected to the circuit which is energized by the closure of switch 52. The fluid inlet connections to the pumps also include servo operated on/off valves 23, 24 these valves being controlled by air pressure in pressure lines 25, 26 which pressure is itself controlled respectively by two solenoid operated air servo valves 27, 28.

The main hydrogen peroxide supply line 19 between the pump 17 and combustion unit 10 is provided with a branch passage 30 leading through a turbine on/off valve 31 and a non-return valve 32, and a turbine speed control valve 33 to an auxiliary decomposition chamber or steam generator 34 from which the oxygen and super-heated steam is fed to the turbine 16. The turbine on/off valve 31 is solenoid operated and comprises a piston type shuttle valve 35 which is normally held closed by any pressure in the main supply line 19, but which is unbalanced by the solenoid mechanism to connect one side of the shuttle to relief so that the valve will then open at a predetermined value of pressure in this main supply line 19. The valve 31 thus includes an armature 70, a solenoid winding 71 and a relief port 72. The movable armature 70 normally is displaced to the right in the drawing to close the relief port 72 so that the shuttle valve 35 is forced to the left by the pressure existing in the main supply line 19. When the solenoid winding 71 is energized, the armature moves to the left to close the adjacent internal pressure drilling and the right hand end of the shuttle valve 35 is then subject to the relief pressure. The valve member 35 will remain closed until the pressure in the branch passage 30 on the downstream side of the valve rises sufficiently to open the valve 35. The non-return valve 32 is arranged to permit the flow of fluid from the main supply line towards the turbine but to prevent flow in the opposite direction. The turbine speed control valve 33 comprises a shuttle type valve 36 member arranged to provide a variable restriction to the flow of hydrogen peroxide to the steam generator 34, this shuttle being acted on by the pressure of hydrogen peroxide derived from a tapping 37 on the downstream side of the pump, this pressure acting against a spring to control the setting of the valve.

An auxiliary starting circuit is provided to supply hydrogen peroxide to the turbine 16 before the normal hydrogen peroxide pump 17 is operative. This starting circuit includes a tapping 40 from the hydrogen peroxide inlet line on the upstream side of the pump 17 leading through an electrically driven starter pump 41 and a non-return valve 42 and communicating with the branch passage 30 at a point between the non-return valve 32 in that passage and the auxiliary decomposition chamber 34. The non-return valve in the starting circuit is arranged to permit the flow of hydrogen peroxide from the starter pump towards the turibne but to prevent flow in the opposite direction.

In the main hydrogen peroxide supply line 19 adjacent the combustion unit is provided a pressure actuated on/off valve 43 which is normally held closed by a spring but is arranged to overbalance open when the pressure in the supply line reaches a predetermined value.

A pressure responsive switch 44, comprising a diaphragm 55 associated with electrical contacts 56, 57, is also connected to the main hydrogen peroxide supply line 19 between the hydrogen peroxide pump 17 and the on/off valve 43 referred to, and this switch is arranged to interrupt the power supply to the electric motor 45 driving the starter pump 41 when the pressure of hydrogen peroxide in the main supply line reaches a predetermined value which is sufficient to provide oxygen and super-heated steam to drive the turbine.

The kerosene pump 18 is connected to the burner 13 of the combustion unit through a kerosene on/off valve 46 which is servo operated by the kerosene pressure in line 20 under control of a solenoid operated valve 47. The valve 47 includes a movable armature 58 which, in the position illustrated, closes the branch passage communicating with the line 20, so that the passage 59 is connected to relief. The armature 58 normally is displaced to the right hand end of the valve chamber closing the vent port at that end and affording communication between the passage 59 and the fuel supply line 20. When the solenoid is operated, the armature moves into the position illustrated. The kerosene on/off valve 46 comprises a piston type shuttle member 48 which is biassed in a closed direction by a spring and is also normally held closed by any pressure in the kerosene supply line 20 which is in communication with passage 59 via the valve 47. When the solenoid valve 47 is actuated, the passage 59 is vented to relief and when the pressure in the supply line 20 reaches a predetermined value the valve member 48 moves downward into the position illustrated in the drawing and the valve 47 thus opens to allow the kerosene to enter the combustion unit. The solenoid valve 47 is arranged electrically in series with a pressure switch 49 including a diaphragm or similar pressure responsive member acted upon by the pressure in the combustion chamber 14 and so arranged that the kerosene on/off valve cannot open until the pressure within the combustion chamber has reached a predetermined value.

To prevent air entering the pumps 17, 18 and supply conduits, under conditions of zero or negative gravity for example, the system is arranged to shut down the fuel supply when hydrogen peroxide is displaced by air at the inlet to the hydrogen peroxide pump 17. To this end a fluid indicator 50 is provided in the hydrogen peroxide inlet line 21 upstream of the main hydrogen peroxide on/off valve 23, and this indicator is arranged to operate an electrical relay 51 when air is present in the line so as to de-energise the air servo operated on/off valves 23, 24 between the tanks and the two pumps. This relay is also arranged to prevent operation of the starter pump 45 under such circumstances.

The fluid indicator 50 comprises two electrodes which with the dielectric between them comprise a condenser. The dielectric is constituted by the fluid in the inlet line 21 and the capacitance of the condenser is determined by the nature of this dielectric. If the dielectric changes from hydrogen peroxide to air, the capacitance will be changed and the current in an electric circuit including the coil of the relay 51 connected across the electrical supply will be correspondingly altered so that the relay will operate when hydrogen peroxide is displaced by air in the inlet line 21.

The starting sequence for the rocket engine is initiated by closing a main electric switch 52 which is arranged to energize the solenoids 84, which are shown in the energized position in the drawing, so as to open the valves 81 to allow the pressurized nitrogen from bottles 80 to enter the tanks 53, 54 and to close the valves 83 of the vents 82 to allow the pressurised nitrogen to enter. The main air servo operated valves 23, 24 on the inlet sides of the pumps are simultaneously opened by means of the solenoid valves 27, 28, and the two propellants flow through the pumps and flood the supply lines 19, 20 up to the pressure operated on/off valves 43, 46 adjacent the combustion unit itself.

Closing this switch also completes the electrical circuit to the turbine on/off valve 31 in the branch passage 30 so rendering this valve free to open, and also completes the circuit to the motor 45 driving the starter pump 41 through the relay which is actuated by the pressure responsive switch 44 in the main hydrogen peroxide supply line.

Hydrogen peroxide is then delivered under pressure from the starter pump 41 to the auxiliary steam generator 34 and the resultant oxygen and super-heated steam passes to the nozzle assembly of the turbine 16. As the turbine accelerates the delivery pressure of the hydrogen peroxide pump 17 rises and at a predetermined value, which exceeds the output pressure of the starter pump 41, the pressure responsive switch 44 in the hydrogen peroxide supply line breaks the circuit to the relay associated with the starter pump motor 45 and the motor is switched off. The turbine on/off valve 31 has in the meantime opened and the non-return valve 32 adjacent to it then opens allowing hydrogen peroxide to pass to the turbine from the hydrogen peroxide supply line 19. The turbo pump 11 is then self-sustaining.

The delivery pressures of both hydrogen peroxide and kerosene pumps 17, 18 rise rapidly and at a predetermined pressure the hydrogen peroxide on/off valve 43 opens to admit hydrogen peroxide to the combustion unit where it is decomposed and injected into the combustion chamber 14 as superheated steam and oxygen. When a given pressure is reached in the combustion chamber the pressure switch 49 associated therewith is closed and this automatically opens the kerosene on/off servo valve 46 to allow fuel to pass the burner unit 13 and into the combustion chamber where it is ignited by the high temperature high pressure oxygen and super-heated steam.

While the engine is running the speed of the turbo pump 11 is maintained substantially constant by the speed control valve 33 in the branch passage 30 which meters the supply of hydrogen peroxide to the auxiliary steam generator 34 in accordance with the output pressure of the hydrogen peroxide pump.

What we claim as our invention and desire to secure by Letters Patent is:

A rocket motor fuel supply system for a rocket engine comprising a main combustion unit including a combustion chamber and a catalytic decomposition chamber, a turbo-pump having two pump sections, one of said pump sections being arranged to deliver hydrogen peroxide through a main supply line to the decomposition chamber, whence the decomposition products issue into the combustion chamber, and means for supplying an organic fuel to the combustion chamber, the fuel supply system including a branch passage from the main supply line on the downstream side of the pump section of the turbo-pump, an auxiliary catalytic decomposition chamber connected to this branch passage, a conduit connected between the auxiliary decomposition chamber and the turbine section of the turbo-pump, and a starting circuit including a pressure generator, said pressure generator comprising a starter pump and an electric motor driving said pump, an inlet connection to the pressure generator from a source of hydrogen peroxide, and an outlet connection between the starter pump and the auxiliary decomposition chamber, a pressure responsive switch responsive to the pressure in the main supply line and controlling the flow of hydrogen peroxide from the starter pump and arranged to shut off this flow when the pressure in the main supply line exceeds a predetermined value the other pump section of said turbo-pump having an inlet connected to a source of organic fuel and an outlet connected to the main combustion unit, a control valve in the delivery side of said other pump section, and a pressure sensitive device responsive to the pressure in the main combustion chamber and operatively connected to the control valve to open this valve and admit the organic fuel to the combustion unit when the pressure in the main combustion chamber reaches a predetermined value.

References Cited in the file of this patent

UNITED STATES PATENTS

| | | |
|---|---|---|
| 2,701,949 | Secord et al. | Feb. 15, 1955 |
| 2,715,313 | Fleming et al. | Aug. 16, 1955 |
| 2,763,126 | Halford et al. | Sept. 18, 1956 |
| 2,785,532 | Kretschmer | Mar. 19, 1957 |

FOREIGN PATENTS

| | | |
|---|---|---|
| 738,219 | Great Britain | Oct. 12, 1955 |